June 24, 1930.  W. E. HECK ET AL  1,768,402
SIDE DRAFT ELIMINATOR FOR GANG PLOWS
Filed Sept. 9, 1929  2 Sheets-Sheet 2
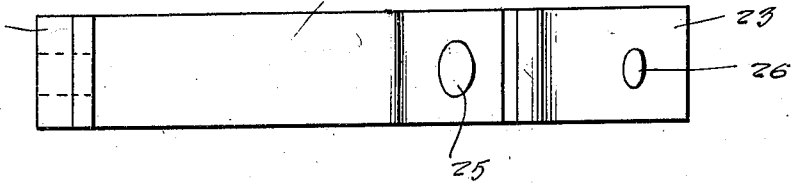
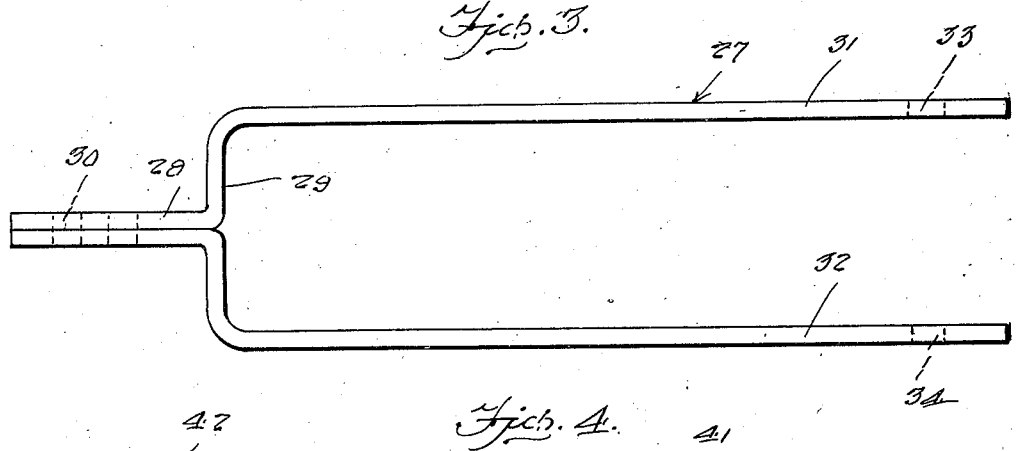
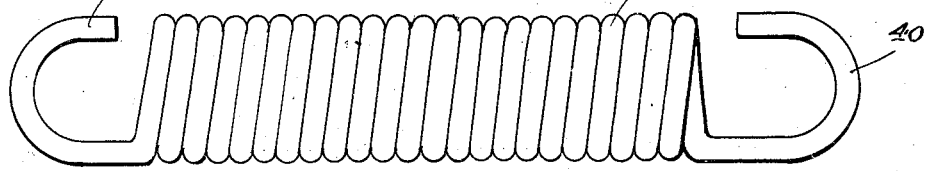
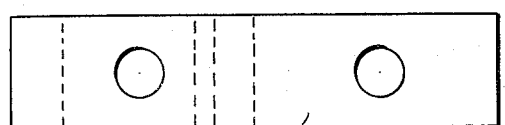
Inventors
William E. Heck
John Ellermeyer
By Clarence A. O'Brien
Attorney Patented June 24, 1930

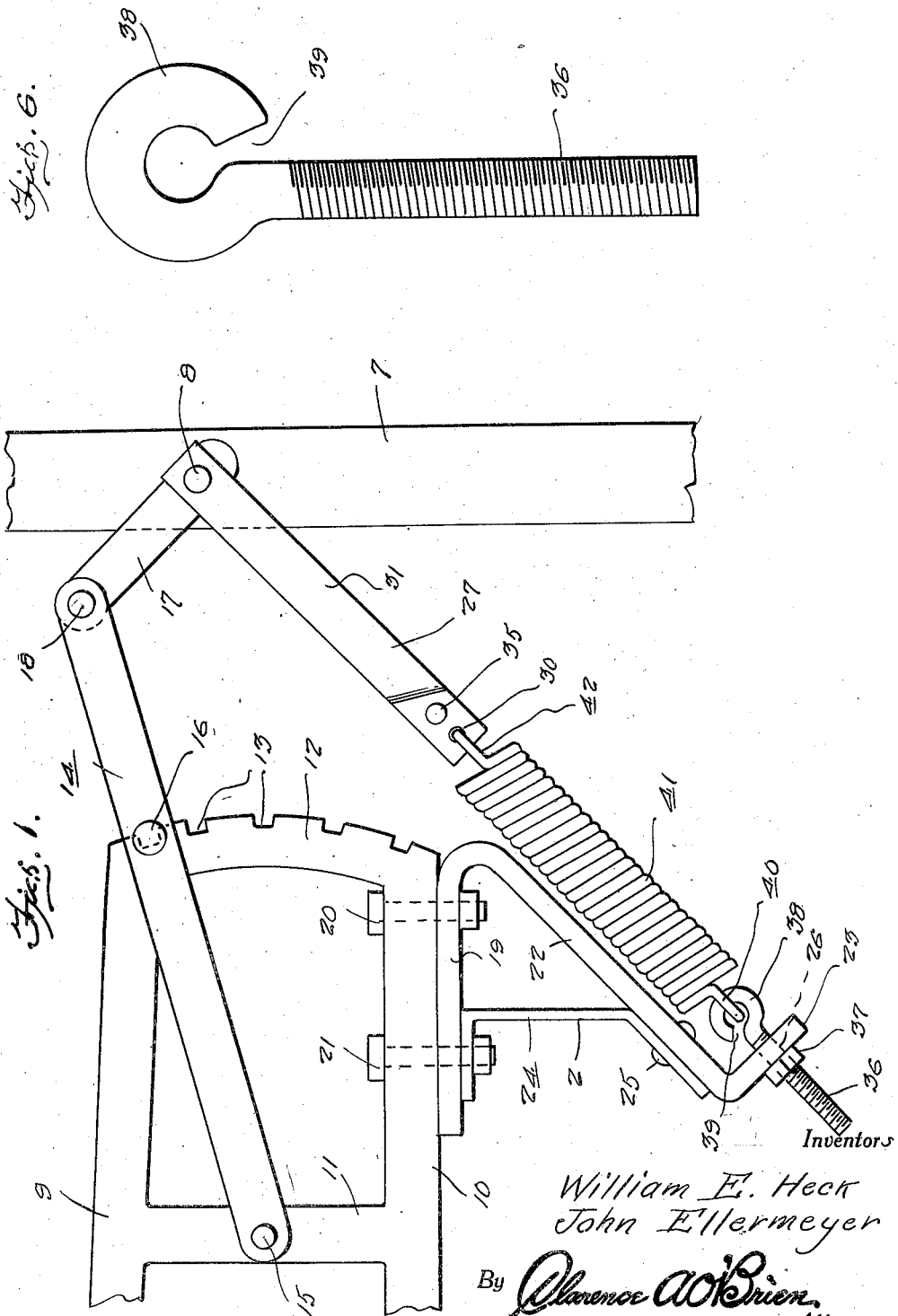

1,768,402

UNITED STATES PATENT OFFICE

WILLIAM E. HECK AND JOHN ELLERMEYER, OF DU BOIS, WASHINGTON

SIDE DRAFT ELIMINATOR FOR GANG PLOWS

Application filed September 9, 1929. Serial No. 391,241.

This invention relates to side draft plows and, is particularly adapted to gang plows drawn by three or four horses abreast, and an object of the invention is to provide adjustable means on the plow beam so that the side draft of the plow is minimized.

Another object of the invention is to provide a device of the character referred to, that will even the pull on the draft animals while turning the plows or while turning the plows at an angle with respect to the longitudinal pull.

Further objects of the invention are to provide, in a manner as hereinafter set forth, a side draft minimizer of the character referred to which is strong, compact and durable, thoroughly reliable for its intended purpose, and minimizes side draft which is so often found in gang plows, that is very simple in its method of assembly and comparatively inexpensive to manufacture and install on standard plows.

With the foregoing and other objects in view, the invention consists in the novel construction, combination and arrangement of parts, as will be hereinafter more fully described and illustrated in the accompanying drawings, wherein is disclosed an embodiment of the invention, but it is to be understood that variations and modifications may be resorted to without departing from the spirit of the invention or the scope of the appended claims.

In the drawings, wherein like reference characters denote corresponding parts throughout the several views:

Figure 1 is top plan view of the end of the gang plow beam and the draft tree illustrating an application of the present invention therewith.

Figure 2 is an elevation of the bracket.

Figure 3 is a side elevation of the U-shaped link.

Figure 4 is a side elevation of the spring,

Figure 5 is a side elevation of the bracket looking at the space that is attached to the gang plow beam, and Figure 6 is a side elevation of the adjustable I bolt.

Referring to the drawings in detail, wherein is disclosed an embodiment of the invention, 7 is the draft tree of a three or four horse abreast evener that is of a length consistent with four horse hitches. The draft tree 7 is formed of wood or metal as desired. The draft tree 7 is formed with an opening in its center through which the clevis bolt 8 is adapted to extend.

9 and 10 indicate the forward ends of a two-gang plow beam having a cross brace 11, spaced rearwardly on their forward ends. Secured across the forward end of the plow beams 9, 10, is a plate 12, formed on the forward edges with notches 13. A customary draw bar 14 is pivoted at its rear end, as at 15, along the center line between the two plow beams 9, 10, to the brace 11. A bolt 16 is detachably seated in the draw bar 14 and depends from the under side thereof to engage in the notches 13 for holding the draw bars at any desired angle with respect to the center of draft. A clevis 17 is pivoted at its rear end as at 18 to the forward end of the draft bar 14 and the forward end of the clevis straddles the draft tree 7 and is pivotally secured thereto by the bolt 8. The foregoing description applies to the conventional attachment of a two gang plow to the tree 7 of the three or four horse abreast evener.

Now the present invention is adapted to be applied on the right sides of the plow beams 9 and 10 when the right handed plow is used, and on the left side of the plow beams 9, 10, when it is to be coupled to a left handed plow. In the present invention, the applicant is described in connection with a right handed plow.

Adjacent the forward end of the plow beam 10 there is secured one leg 19 of an acute angled bracket, by means of a pair of bolts 20, 21. The vertex of the acute angled bracket projects forwardly. The other leg 22 of the acute angled bracket is formed with a laterally projecting extension 23, that projects at right angles to the plane of the leg 22. The legs are reinforced by a cross strap 24, of which one end is secured by the attaching bolt 21 and the other end is riveted as at 25 to the leg 22. An opening 26 is formed centrally of the extension 23 and extends in a plane substantially parallel to the plane of the leg 22.

A substantially U-shaped link indicated generally at 27, has an extension 28 projecting rearwardly from the bight portion 29 thereof and adjacent the rear end of the extension, there is an opening 30 to receive the outer end of the spring in a manner to be presently described. The opposite legs 31, 32, are adapted to straddle the draft tree 7, and each leg is provided with an opening 33, 34 adjacent the outer end of each leg. The openings 33, 34, are in alignment with each other and are adapted to receive the bolt 8 that extends through the tree 7 and the clavis 17. The link 27 is formed of a pair of straps of substantially Z-shaped configuration, the one leg of the Z being brought into abutment and riveted as at 35, to form the links. The web of the Z-shaped strap forms the bight portion and the other legs of each strap form the legs of the U-shaped link, as will be clearly understood by referring to Figure 3 of the drawings.

The threaded portions 36 of an eye bolt is adapted to extend through the opening 26 on the extension 23. A nut 37 threadably engages about the threaded end of the eye bolt and forms an abutment against the rear face of the extension 23. The threaded portion 36 is of such a length as to provide for moving the bolt inwardly or outwardly with respect to the extension 23, by turning the nut 37 inwardly or outwardly upon the threads. The eye 38 of the eye bolt is provided with a suitable space 39 to receive the rear hook 40 of the helical coil spring 41, on the forward end of which is a hook 42 that is adapted to be detachably seated in the opening 30 of the link 27. The helical coil spring 41 forms a resilient connection between the links 27 and the acute angled brackets.

Tension on the coil spring 41 may be increased as desired by adjustment of the eye bolt with respect to the extensions 23. The helical coil spring 41, under normal conditions is disposed in parallel relation to the leg 22 and the leg 22 is disposed at an acute angle with respect to the line of draft on the plow beam, so that any lateral draft will be compensated for by the present invention.

It is to be understood that by describing in detail herein any particular form, structure, and arrangement, it is not intended to limit the invention beyond the terms of the several claims or the requirements of the prior art.

What is claimed is:

1. A draft device for gang plows comprising a tree bar an acute angled bracket having one leg adapted to be secured to either side of the forward end of the plow beam, an extension formed on the free end of the other leg at right angles thereto, a substantially U-shaped link adapted to have the legs thereof straddle the tree bar and having aligned openings adjacent the ends of each leg to receive the bolt by which the tree is secured to the plow beam, and resilient means connecting the inner end of the link and the extension.

2. A draft device for gang plows comprising a tree bar an acute angled bracket having one leg adapted to be secured to either side of the forward end of the plow beam, an extension formed on the free end of the other leg at right angles thereto, a substantially U-shaped link adapted to have the legs thereof straddle the tree bar and having aligned openings adjacent the ends of each leg to receive the bolt by which the tree is secured to the plow beam, and resilient means connecting the inner end of the link and the extension, said leg that is secured to the plow beam being disposed in parallel relation thereto, with the vertex of the angle extending forwardly.

3. A draft device for gang plows comprising a tree bar an acute angled bracket having one leg adapted to be secured to either side of the forward end of the plow beam, an extension formed on the free end of the other leg at right angles thereto, a substantially U-shaped link adapted to have the legs thereof straddle the tree bar and having aligned openings adjacent the ends of each leg to receive the bolt by which the tree is secured to the plow beam, and resilient means connecting the inner end of the link and the extension, said leg that is secured to the plowbeam being disposed in parallel relation thereto, with the vertex of the angle extending forwardly, said resilient means being disposed at an acute angle with respect to the pull on the plow beam.

4. A draft device for gang plows comprising a tree bar an acute angled bracket having one leg adapted to be secured to either side of the forward end of the plow beam, an extension formed on the free end of the other leg at right angles thereto, a substantially U-shaped link adapted to have the legs thereof straddle the tree bar and having aligned openings adjacent the ends of each leg to receive the bolt by which the tree is secured to the plow beam, and resilient means connecting the inner end of the link and the extension, said leg that is secured to the plow beam being disposed in parallel relation thereto, with the vertex of the angle extending forwardly, said resilient means being disposed at an acute angle with respect to the pull on the plow beam, said resilient and adjustable means including a helical coil spring having a hook on each end, an eye bolt movably connected to the extension and having the eye thereof engaging with one hook and the other hook on the spring engaging with the inner end link.

In testimony whereof we affix our signatures.

WILLIAM E. HECK.
JOHN ELLERMEYER.